United States Patent [19]

Francis et al.

[11] 4,356,271
[45] Oct. 26, 1982

[54] NONCOLLAPSIBLE CERAMIC FOAM

[75] Inventors: Thomas L. Francis, Murrysville; John E. Marhanka, Delmont; Raymond P. Heilich, Upper Burrell Township, Westmoreland County, all of Pa.

[73] Assignee: Aluminum Company of America, Pittsburgh, Pa.

[21] Appl. No.: 254,926

[22] Filed: Apr. 16, 1981

Related U.S. Application Data

[63] Continuation-in-part of Ser. No. 153,596, May 27, 1980, abandoned.

[51] Int. Cl.$^3$ .............................................. C04B 21/00
[52] U.S. Cl. ........................................ 501/84; 106/88; 106/106; 264/43; 501/89; 501/107; 501/127; 501/128; 501/133; 501/142
[58] Field of Search ............... 501/84, 124; 106/106, 106/88; 264/43, 44

[56] References Cited

U.S. PATENT DOCUMENTS

| 2,966,421 | 12/1960 | Zimmerman et al. | 501/84 |
| 2,992,930 | 7/1961 | Wheeler et al. | 501/84 |
| 3,041,190 | 6/1962 | Griffith et al. | 501/84 |
| 3,141,781 | 7/1964 | Dreyling et al. | 501/84 |
| 3,148,996 | 9/1964 | Vukasovich | 501/84 |
| 3,232,772 | 2/1966 | Hilton et al. | 501/84 |
| 3,353,975 | 11/1967 | Shannon et al. | 106/106 X |
| 3,554,907 | 1/1971 | Moore | 501/84 X |
| 3,762,935 | 10/1973 | Leach | 501/84 |
| 3,966,482 | 6/1976 | Cassidy et al. | 501/124 |
| 3,999,995 | 12/1976 | Henton | 501/80 |
| 4,004,933 | 1/1977 | Ravault | 501/81 |
| 4,088,502 | 5/1978 | La Bar | 501/124 |
| 4,158,568 | 6/1979 | La Bar | 501/124 |
| 4,174,226 | 11/1979 | Fitzpatrick et al. | 501/124 |
| 4,246,035 | 1/1981 | Maczura et al. | 501/124 |

FOREIGN PATENT DOCUMENTS 676621 1/1948 United Kingdom .

Primary Examiner—Helen M. McCarthy
Attorney, Agent, or Firm—Max L. Williamson

[57] ABSTRACT

A lightweight, porous, ceramic material is made by mixing a slurry containing a foaming agent until a constant volume of foam is achieved. The foam is then pumped or poured into a mold or form where it sets up into a cellular structure. The formed foam is then cured, dried and heated at elevated temperatures. The slurry used in making the foam is made from ceramic particles, water, foaming agent and bonding materials. The bonding materials function to provide an initial bond as the foam is generated to prevent foam collapse, a low temperature bond after the foam structure is set, cured and dried, and a final bond after heating to elevated temperatures. In a preferred embodiment, the ceramic particles used are alumina.

11 Claims, No Drawings

NONCOLLAPSIBLE CERAMIC FOAM

This is a continuation-in-part of our Ser. No. 153,596, filed May 27, 1980, now abandoned.

BACKGROUND OF THE INVENTION

This invention relates to a method for making refractory foam compositions.

Lightweight, porous materials, such as fiberboard, loose fills (powders) and hydraulic setting castables, have long been used in thermal insulating applications. Commercially available insulating castables include fused alumina bubbles, bulk fibers, and/or organic "burnout" materials. Efforts to improve thermal insulators made with these materials have included reduction of setting times, use of slurries having specific viscosities, and increase of foam porosity. Hilton et al in U.S. Pat. No. 3,232,772, for example, teach the importance of selecting a setting agent which acts at a rate slow enough that the slip remains sufficiently fluid to be poured into the mold, yet fast enough that the cellular structure of the foam is preserved. Another view with respect to a suitable setting agent is expressed in British Pat. No. 676,621 for "Porous Refractory Products and Their Method of Manufacture". This British patent teaches that simultaneity of formation of bubbles and of setting of the suspension is essential in making a suitable porous refractory product. Specific starting materials which supposedly produce a superior ceramic foam have also been the subject of several patents. Griffith et al in U.S. Pat. No. 3,041,190 for example, teach that using colloidal alumina having the boehmite crystal structure as a foam stabilizer in combination with a foaming agent and larger than colloidal size alumina produces a dimensionally stable foamed refractory. Zimmerman et al in U.S. Pat. No. 2,966,421 disclose a ceramic made from alumina and phosphoric acid in which the ratio of alumina to phosphoric acid is about 3 to 1. This ratio is said to be significant in that sufficient phosphoric acid is present to allow the alumina to become bonded with a phosphate bond of sufficient strength to prevent collapse of the foam. Zimmerman et al also limited the water content of their slurry to 12 to 15 wt.%, and included a stabilizer which was intended to absorb excess water and thereby increase the viscosity of the slurry and prevent slumping of the foam.

A glass frit was included in the foamed ceramic material of Leach U.S. Pat. No. 3,762,935. This patent discloses a foamed-in-place shaped article suitable as an insulating material which is made by mixing aluminum oxide, a glass frit and bentonite, adding phosphoric acid to the mixture to form a slurry, and charging the slurry to a mold where it is allowed to foam at ambient temperature. The glass frit used by Leach produces a glassy phase as the result of the exothermic reaction of the formulation base. This glassy phase permits the cells individually to grow larger and to remain unconnected, thereby decreasing the solids to volume ratio of the foam.

Despite the efforts of those in the art, a foamed ceramic which would retain the foam structure in a high temperature environment without a significant degree of collapse, i.e. a foamed ceramic with practically no linear shrinkage, has not been developed. A ceramic foam having these properties of high temperature tolerance with minimal linear shrinkage and corrosion resistance would be a particularly advantageous thermal insulator for high temperature reactors.

SUMMARY OF THE INVENTION

It is an object of the present invention to provide a foam insulating refractory material which is quick-setting, stable and resistant to attack by molten metals, salts or gases with which it comes into contact.

It is also an object of the present invention to provide a foamed refractory which can be poured or pumped into cavities both simple and complex in geometry to produce a homogeneous insulating monolith. The foam has a closed cellular structure so that the permeability is low, thereby making the refractory an excellent barrier to the transmission of heat and to the flow of corrosive fluids.

It is a further object of this invention to provide a method for making a noncollapsible foam refractory useful as an insulator which is quick-setting, resistant to metal corrosion and resistant to thermal shock, and having minimal shrinkage characteristics.

These and other objects which will become apparent to those skilled in the art are accomplished by the foamed refractory and the method for making the foamed refractory disclosed more fully below.

In accordance with these objects, a foamed ceramic material is made by mixing a slurry containing a foaming agent until the foam's volume is constant. The foam is then delivered into a cavity in which the foam sets up into a closed cellular structure. The formed foam is then cured, dried and fired to produce a foamed ceramic shape. The slurry used in making the foam is made from a ceramic material, such as alumina, water and combinations of bonding materials.

Not only must the bonding materials provide a low temperature bond and a final high temperature bond, but the low temperature bond must be such that it sets up rapidly enough to stabilize the foam to prevent collapse, but not so rapidly that the foamed slurry cannot be placed in the mold. Mixtures of bonding materials which provide the above characteristics are, for example:

(1) a colloidal bonding material, aluminum hydroxychloride and MgO powder;
(2) a colloidal bonding material, calcium aluminate cement and aluminum hydroxychloride;
(3) calcium aluminate cement, boric acid powder, zinc borosilicate frit and hydrochloric acid; and
(4) a colloidal bonding material, calcium aluminate cement and phosphoric acid.

DETAILED DESCRIPTION OF THE PREFERRED EMBODIMENTS

A slurry is made by mixing water, ceramic particles, a foaming agent and mixtures of bonding materials described below. Suitable ceramic particles include alumina, refractory grade bauxite, mullite, fused silica, kyanite, clay, silicon carbide and zircon, with alumina being the preferred material. The alumina found to be particularly desirable is calcined alumina having a low soda content, a particle size of 15 microns or less, a purity of 99.0% or better and a Loss on Ignition (LOI) (1200° C.) of 0.4% or less. Loss on Ignition (LOI) was determined by heating a sample of the alumina at 300° C. for two hours to drive off the sorbed water. The sample was then further heated to 1200° C. and maintained at that temperature for two hours. LOI is equal to the percent of the difference between weight of the sample at 300° C. and weight of the sample at 1200° C. over the weight of the sample at 300° C. Dodecyl benzene sulfonate and sodium alkyl aryl sulfonates are typical of foaming agents which may be used in the practice of the present invention, but other foaming agents are suitable.

The slurry is rapidly agitated with a mechanical mixer prior to placement in a mold. Rapid agitation is preferred in order to quickly disperse the materials in the slurry and maximize the introduction of air into the slurry for optimum foaming. Alternatively, mixing may be accomplished by any method which introduces air or a gas into the mixture to produce foam. The mixing is continued until the volume of the foam remains constant. After the foam has reached constant volume, it is deposited by pouring or pumping it into the desired mold or form. Suitable molds are known to those in the art. The foam sets up into a closed cellular structure rapidly. The setting time may be anywhere between five minutes and six hours, although 20 minutes to one hour is the preferred range. The foam is then cured, air-dried, then exposed to low temperature drying (in an oven at 110° C., for example) for a period of time such as 12 to 48 hours, and lastly is heated at a higher temperature (650° C. to 1000° C., for example). By cured is meant changes in chemical composition that occur in the foamed structure. If calcium aluminate cement is used as a bonding material, for example, water in the foamed mixture combines with the cement to produce a low temperature bond and the mixture is cured by covering the foam to prevent loss of moisture necessary to effect a reaction between the cement and water. The ceramic foam formed by this procedure has a closed cellular structure so that the permeability is low, making the foam an excellent barrier to the transmission of heat and to the flow of corrosive fluids. The bulk density of the foamed refractory may range from approximately 400 to 2000 kg/m³. Although lower density products are advantageous in providing refractories having lower heat conductance characteristics, lower density products typically have lesser mechanical properties as well. In some applications, therefore, a low bulk density product may not be satisfactory because of a need to satisfy certain structural requirements. Upon heating of the foam, some of the liquid evaporates resulting in a foamed ceramic having a decreased bulk density with minimal linear shrinkage. That little or no shrinkage occurs upon heating can be seen from the data presented below in Table II.

The refractory made in accordance with the method of the present invention requires a bond which sets up rapidly enough to stabilize the foam to prevent collapse but not so rapidly as to prevent placement of the slurry in the desired mold. Additionally, the bond must be resistant to attack by molten metal, salts or gases with which it comes into contact. The chemical inertness (or resistance to chemical attack) of the ceramic foam and suitability for particular applications are attributable to the particular bond system of the foamed ceramic. The bonding materials suitable for making the noncollapsible ceramic foam of the present invention include: (1) a colloidal bond material, (2) calcium aluminate cement, (3) aluminum hydroxychloride, (4) magnesium oxide, (5) boric acid, (6) zinc borosilicate frit, (7) hydrochloric acid, (8) phosphoric acid, and (9) alumina. The colloidal bond material functions to provide a small particle which strengthens and stabilizes the foam without causing the foam to collapse. Among colloidal materials suitable for practice of this invention are colloidal aluminas, such as a colloidal alumina having a boehmite structure as described in U.S. Pat. No. 2,915,475, and colloidal gibbsite, with colloidal gibbsite being preferred.

The ceramic particulate material present in the slurry used in making the ceramic foam is provided to impart refractory characteristics to a finished ceramic foam product and may comprise 10 to 80 wt.% of the slurry composition. When ground calcined alumina is the refractory material used, a particularly good ceramic foam can be obtained if the alumina constitutes 20 to 50 wt.% of the slurry composition. If a mixture of ground and unground calcined alumina is used as the particulate refractory material in the noncollapsible ceramic foam, it is preferable that the ground and unground alumina each be present in an amount within the range of 5 to 40 wt.% of the slurry. The foaming agent should comprise approximately 0.05 to 2 wt.% of the slurry with 0.2 to 0.4 wt.% of the slurry being the preferred range. The amount of the bonding materials present in the slurry of the present invention will naturally vary according to which combination is chosen. However, the preferred foamed ceramic compositions are made from slurries in which the bonding materials comprise 5 to 35 wt.% of the slurry. Specific compositional ranges for each bond material when used in the present invention are as follows: 1 to 25 wt.% colloidal gibbsite, 2 to 35 wt.% phosphoric acid, 1 to 8 wt.% aluminum hydroxychloride, 7 to 15 wt.% boric acid, 7 to 20 wt.% zinc borosilicate frit, 8 to 35 wt.% hydrochloric acid, 2 to 25 wt.% calcium aluminate cement and 0.1 to 2 wt.% magnesium oxide (magnesia). Water constitutes the remainder of the slurry composition.

The preferred noncollapsible ceramic foam compositions of the present invention include the foams formed from slurries using (1) calcium aluminate cement, phosphoric acid, and colloidal gibbsite, (2) colloidal gibbsite, calcium aluminate cement and aluminum hydroxychloride, and (3) calcium aluminate cement, boric acid, zinc borosilicate frit and hydrochloric acid.

Where the calcium aluminate cement plus phosphoric acid and colloidal gibbsite bonding system is used, it is desirable that the compounds present in the slurry be present within the following ranges: 20 to 50 wt.% calcined alumina, 1 to 20 wt.% colloidal gibbsite, 2 to 25 wt.% calcium aluminate cement, 0.05 to 2 wt.% foaming agent, 2 to 35 wt.% phosphoric acid (85% concentration) and 20 to 60 wt.% water. The preferred slurry composition for the slurry having this bond system is 31 to 43 wt.% calcined alumina, 5 to 15 wt.% colloidal gibbsite, 4 to 12 wt.% calcium aluminate cement, 0.20 to 0.35 wt.% foaming agent, 6 to 13 wt.% phosphoric acid and 30 to 43 wt.% water.

When colloidal gibbsite and calcium aluminate cement plus aluminum hydroxychloride is the bonding system used, the slurry should have the following composition: 10 to 80 wt.% calcined alumina (up to half of which may be unground), 1 to 20 wt.% colloidal gibbsite, 2 to 25 wt.% calcium aluminate cement, 0.05 to 0.5 wt.% foaming agent, 1 to 8 wt.% aluminum hydroxychloride and 15 to 55 wt.% water. The preferred ranges for the slurry are 40 to 44 wt.% calcined alumina (up to half of which may be unground), 9 to 10.5 wt.% colloidal gibbsite, 8 to 13 wt.% calcium aluminate cement, 0.1 to 0.3 wt.% foaming agent, 3 to 4 wt.% aluminum hydroxychloride and 30 to 35 wt.% water.

If calcium aluminate cement and boric acid plus zinc borosilicate frit plus hydrochloric acid is the bonding system used, the slurry should preferably be composed of 40 to 44 wt.% calcined alumina, 7 to 8 wt.% calcium aluminate cement, 7 to 8 wt.% boric acid, 7 to 8 wt.% zinc borosilicate frit, 0.2 to 0.4 wt.% foaming agent, 8 to 9 wt.% hydrochloric acid and 25 to 27 wt.% water.

The most preferred embodiment of a refractory of this invention is that which includes calcium aluminate cement, colloidal gibbsite and phosphoric acid as bonding materials. With rapid mixing of all of the ingredients except the phosphoric acid, i.e. ceramic particulate, foaming agent, colloidal gibbsite, calcium aluminate cement and water, a foamed slurry having a density of approximately 1000 kg/m$^3$ was produced. For reasons that are not fully understood, addition of phosphoric acid to the slurry thus formed, accompanied by continued rapid mixing caused the foamed slurry to increase in volume with a consequent reduction in density to approximately 700 kg/m$^3$. It is believed that the increase in volume is due to an apparent chemical reaction which probably occurs between the phosphoric acid and the cement, producing water or steam which causes further expansion of the foam.

In this most preferred embodiment, the initial bond, i.e. the bond which is generated during foaming so as to impart stability to the foam is derived from the colloidal gibbsite which functions as a foam stabilizer. The fine particles dispersed throughout the foam serve to provide reinforcement for the foamed structure. The calcium aluminate cement combining with water produces a low temperature hydraulic bond after the foamed material has been allowed to set, cure and dry and the final bond is believed to be aluminum phosphate produced from the reaction between alumina and phosphoric acid upon heating to a higher temperature, such as 1000° C., for example.

In a second preferred embodiment, colloidal gibbsite, aluminum hydroxychloride and calcium aluminate cement are the bonding materials utilized to produce the desired bond systems. In this embodiment, the foamed slurry is formed by rapidly agitating a mixture of ceramic particulate, foaming agent, colloidal gibbsite and calcium aluminate cement with water. After the initial rapid agitation of the slurry to produce foam, aluminum hydroxychloride is added while continuing rapid agitation.

As in the case of the most preferred embodiment, the colloidal gibbsite and calcium aluminate cement bonding materials function to produce the initial and low temperature bond. In this second preferred embodiment, it is believed that the aluminum hydroxychloride produces a gelatinous type bond after drying and also contributes to the initial bond. Upon heating to a higher temperature, such as 650° C., for example, it is believed that the aluminum hydroxychloride produces the final bond, but the nature of the final bond is not known for certain.

In this second preferred embodiment, the density of the foamed refractory is increased over that of the most preferred embodiment to obtain a good dimensional stability characteristic similar to that of the most preferred embodiment. Because of the increased density, a foamed product of this embodiment does not have insulating properties as good as the most preferred embodiment, but has a low water absorption characteristic and is extremely strong.

In a variation of this second preferred embodiment, colloidal gibbsite, aluminum hydroxychloride and magnesium oxide comprise the bonding materials which produce the desired bond systems. To produce a foamed refractory shape, ceramic particulate, foaming agent, colloidal gibbsite, aluminum hydroxychloride and magnesium oxide are combined with water and rapidly agitated to produce foam and agitation is continued until the foamed slurry is of a constant volume. The colloidal gibbsite stabilizes the foam by providing a fine particulate reinforcement. A portion of the aluminum hydroxychloride provides a gelatinous type bond and it is believed that at least some portion of the aluminum hydroxychloride combines with the magnesium oxide to produce a polymer type bond after the mixture has been cured and dried at low temperature. After heating to a higher temperature, such as 650° C., for example, it is believed that the final bond is produced by at least some portion of the aluminum hydroxychloride.

In a further variation of this second preferred embodiment, the aluminum hydroxychloride is added in a liquid form. In this case, the ceramic particulate, foaming agent and colloidal gibbsite are rapidly mixed a sufficient time to produce a stable foam of constant volume. A mixture of aluminum hydroxychloride and magnesium oxide is then added while continuing the rapid mixing and mixed a time sufficient to insure that the aluminum hydroxychloride and magnesium oxide are uniformly dispersed throughout the foam.

In a third preferred embodiment, the bonding materials are calcium aluminate cement, boric acid, zinc borosilicate frit and hydrochloric acid. In this embodiment, the foamed slurry is made by rapid agitation of a ceramic particulate, foaming agent, calcium aluminate cement and water mixture. While continuing the agitation the frit, boric acid and hydrochloric acid are added. In this embodiment, it is thought that the initial bond is provided by the calcium aluminate cement hydraulic bond and a gelatinous bond produced by the combination of the boric acid, zinc borosilicate frit and hydrochloric acid. After heating to a higher temperature, such as 1000° C., for example, it is believed that the boric acid and frit combine to form a final bond.

In the preparation of a foamed ceramic material it may be helpful to include a deflocculant such as a deflocculant sold under the trademark Daxad 30 by W. R. Grace Co. The deflocculant is advantageous in promoting dispersion of the particulate materials in the water while mixing to produce a slurry.

This invention may be better appreciated through the following examples.

EXAMPLE 1

Table 1 lists the composition of this first example of a foamed refractory of this invention. In preparing the example, a slurry was made by adding all of the dry materials to the water while mechanically agitating the mixture to obtain a uniform disperson. Any mechanical agitation method sufficient to obtain a uniform dispersion of the solids in the water is satisfactory, and in preparing a 750 ml sample of Example 1, a portable hand mixer was used. A 3⅜ inch diameter, 10 mesh stainless steel mixing disc was used to accomplish the mixing and the mixer was operated at 610 rpm.

TABLE I

| Raw Material Component | Dry Mix Composition wt. % | Foam Composition wt. % |
|---|---|---|
| −325 mesh (Tyler Series) calcined alumina | 64.7 | 37.7 |
| colloidal gibbsite | 14.9 | 8.7 |
| calcium aluminate | 19.9 | 11.6 |
| foaming agent | 0.48 | 0.29 |
| deflocculant | 0.02 | 0.01 |
| solids total | 100.0 | |
| phosphoric acid* (85% conc.) | | 7.0 |
| water | | 34.7 |
| total | | 100.0 |

*specific gravity of 1.7

After the solids were uniformly dispersed in the water, the agitating speed was increased to a relatively higher speed, 760 rpm for example, to introduce air into the mixture and generate foam. Mixing was continued until the mixture attained a constant volume. The density of the foam at this constant volume was determined to be 1000 kg/m³.

The phosphoric acid was then added to the mixture and mixing was continued at the relatively higher speed. It was observed that the phosphoric acid caused a further increase in volume and mixing was continued until the volume was constant once more. Density of the foam after the phosphoric acid was added was determined to be 700 kg/m³, and its viscosity was approximately 5000 cps (centipoises). The foam was readily pourable and was then poured into a mold.

The alumina used in making this slurry was Alcoa's A-2 calcined alumina which has the following typical analysis:

| Ultimate crystal size | less than 5 microns |
|---|---|
| Al₂O₃ | 99.2% |
| SiO₂ | 0.02% |
| Fe₂O₃ | 0.04% |
| Na₂O | 0.45% |
| LOI (1200° C.)[1] | 0.2% |
| Total Water (Sorption Ignition Test)[2] | 0.3% |
| Specific Gravity | 3.7–3.9 |

[1]Loss on Ignition (LOI) was determined by heating a sample of the alumina at 300° C. for two hours to drive off the sorbed water. The sample was then further heated to 1200° C. and maintained at that temperature for two hours LOI is equal to the percent of the difference between weight of the sample at 300° C. and weight of the sample at 1200° C. over the weight of the sample at 300° C.
[2]The Sorption Ignition Test consists of exposure of the calcined alumina to an atmosphere having a relative humidity of 44% and subsequent ignition of the sample.

The colloidal gibbsite used in making this slurry was a hydrated alumina made by Alcoa and identified as Hydral 710 and has the following typical analysis:

| Al₂O₃ | 64.7% |
|---|---|
| SiO₂ | 0.04% |
| Fe₂O₃ | 0.01% |
| Na₂O | 0.45% |
| H₂O | 34.8% |
| Moisture (110° C.) | 0.3% |
| Specific Gravity | 2.40 |
| Surface Area (m²/gm) | 6–8 |
| Particle Size Distribution: | |
| <2 microns | 100% |
| <1 microns | 85% |
| <0.5 microns | 28% |

The calcium aluminate cement was 79% Al₂O₃, 0.2% SiO₂, 0.3% Fe₂O₃, 0.5% Na₂O, 18% CaO and 0.4% MgO. The cement had an LOI (1100° C.) of 1.5% and passed through 325 mesh (Tyler). The foaming agent used was linear alkyl sulfonate sold under the trademark Nacconol 90F by Stephan Chemical Co., Northfield, Illinois 60093. The deflocculant used was a deflocculant sold under the trademark Daxad 30 by W. R. Grace Co.

The foam was then allowed to cure by covering to prevent the loss of moisture for approximately 14 hours, air-dried for approximately 14 hours, then dried in an oven at 110° C. for 24 hours and heated to temperatures up to 1000° C. Weights and dimensions were measured after each step to determine dimensional stability and density.

Upon drying, the permeability of the foam was low due to its closed cellular structure. The dimensional stability of the ceramic foam after drying and heating is shown by the data presented in Table II. Linear change was calculated by using the equation:

$$\text{Linear change} = \frac{L_F - L_I}{L_I} \times 100\%$$

where, $L_I$=the initial linear dimension, and $L_F$=the final linear dimension. A negative linear change indicates shrinkage.

It can be seen from Table II that although the foam underwent a weight loss and density decrease of about 40%, less than 2% linear change occurred upon heating to 1000° C.

TABLE II

Linear Dimension Change and Weight Loss of Cement-Phosphate Bonded Foam as a Function of Curing, Drying and Heating

| Sample Treatment | | | |
|---|---|---|---|
| From | To | Linear Change (%) | Weight Loss (%) |
| Sample I | | | |
| As cast | Air Dried | −0.02 | 19.2 |
| Air Dried | 110° C. | −0.42 | 21.2 |
| 110° C. | 200° C. | −0.10 | 0.4 |
| 200° C. | 650° C. | −0.57 | 6.3 |
| 650° C. | 1000° C. | −0.25 | 0.8 |
| Sample II | | | |
| 25° C. | 650° C. | −1.09 | 40.6 |
| Sample III | | | |
| 25° C. | 1000° C. | −1.33 | 41.1 |

The pressures required to deform the ceramic foam after various heat treatments are given in Table III. Typical thermal conductivity measurements of a foam of Example 1 made at room temperature were 0.14 W/m·K.° 0.99 Btu·in/h·ft²·F.° after curing in air and 0.088 W/m·K.° 0.61 Btu·in/h·ft²·F.° after heating to 650° C. W/m·K. is watt/meter kelvin.

A refractory produced in accordance with the method described in Example 1 was tested by immersion in molten metal to determine its corrosion resistance. In the immersion test, a test specimen was heated to 1000° F. and then suspended in molten Aluminum Aassociation alloy 7075, the molten metal at a temperature of 1400° F. After 22 hours of immersion, the specimen is removed, scraped and cleaned, and immediately placed in another furnace where it is held for 2 hours at 1000° F. The above 24-hour cycle is repeated six more times. At the end of the seventh cycle, the specimen is cooled to room temperature and examined for evidence of corrosion from the molten metal.

There was no evidence of corrosion to the foam from the molten 7075 aluminum alloy in the immersion test just described and the foam demonstrated good dimensional stability up to 1000° C., as may be noted from Table II.

TABLE III

Pressure Required to Deform Cement-Phosphate Bonded Foam (51-MM dia × 102-MM Cylinders)

| Heat Treatment of Foam | Pressure to Obtain Linear Deformation of | | |
|---|---|---|---|
| | 0.1–0.25% lb/ft² | 1.25–2.5% lb/ft² | 2.5–10% lb/ft² |
| Cured at 25° C. | 300 | 320 | 360 |
| Air dried at 25° C. | 400 | 490 | 560 |
| 110° C. | 550 | 850 | 950 |
| 200° C. | 560 | 820 | 910 |
| 650° C. | 350 | 650 | 7900 |
| 1000° C. | 430 | 860 | 1100 |

EXAMPLE 2

An aluminum hydroxychloride bonding system for a noncollapsible ceramic foam was used in the composition given in Table IV.

TABLE IV

| Raw Material Component | Dry Mix Composition wt. % | Foam Composition wt. % |
|---|---|---|
| ground - 325 mesh (Tyler Series) calcined alumina | 33.0 | 21.5 |
| unground calcined alumina | 33.0 | 21.5 |
| colloidal gibbsite | 15.2 | 9.9 |
| calcium aluminate cement | 18.6 | 12.1 |
| foaming agent | 0.2 | 0.2 |
| solids total | 100.0 | |
| aluminum hydroxychloride | | 3.2 |
| water | | 31.6 |
| total¹ | | 100.0 |

The ground −325 mesh (Tyler) alumina, colloidal gibbsite, calcium aluminate cement and foaming agents had the same analysis as those used in Example 1. The unground alumina had the following analysis:

| Ultimate crystal size | less than 5 microns |
|---|---|
| Al₂O₃ | 99.2% |
| SiO₂ | 0.02% |
| Fe₂O₃ | 0.04% |
| Na₂O | 0.45% |
| LOI (1200° C.)¹ | 0.2% |
| Total Water (Sorption Ignition Test)² | 0.3% |
| Specific Gravity | 3.7–3.9 |
| Sieve Analysis: | |
| On 100 mesh Tyler | 4–15% |
| On 200 mesh Tyler | 50–75% |
| On 325 mesh Tyler | 88–98% |
| Through 325 mesh Tyler | 2–12% |

¹Loss on Ignition (LOI) was determined by heating a sample of the alumina at 300° C. for two hours to drive off the sorbed water. The sample was then further heated to 1200° C. and maintained at that temperature for two hours. LOI is equal to the percent of the difference between weight of the sample at 300° C. and weight of the sample at 1200° C. over the weight of the sample at 300° C.
²The Sorption Ignition Test consists of exposure of the calcined alumina to an atmosphere having a relative humidity of 44% and subsequent ignition of the sample.

The aluminum hydroxychloride was Cawood 5025 aluminum hydroxychloride as made by Cawood Refractories Co., Crabtree Manorway Belvedere, Kent, England.

In this example, all of the dry materials were mixed with water in a manner similar to that described in Example 1 in order to generate foam to a constant volume. The aluminum hydroxychloride was then added while continuing agitation of the foamed mixture for a time sufficient to uniformly disperse the aluminum hydroxychloride throughout the mixture.

The foamed mixture was then poured into a mold, cured, dried and heated as described in Example 1. Typically, this foam is more dense than foams made using the other bonding systems described in this application to make a foam material of this invention. This increased density is believed to contribute to the dimensional stability, increased thermal conductivity and strength of this noncollapsible ceramic foam.

Measurements at room temperature showed a thermal conductivity of 0.45 W/m·K.°, i.e. 3.1 Btu·in/h·ft²·F.°, after curing the foam in air and 0.20 W/m·K.°, i.e. 1.4 Btu·in/h·ft²·F.°, after heating the foam to 650° C. The foam did not absorb moisture upon standing at room temperature for months. The linear shrinkage upon heating for this foamed composition was substantially the same as that of Example 1.

EXAMPLE 3

The composition of frit-boric acid bonded foam is given in Table V.

TABLE V

| Raw Material Component | Dry Mix Composition wt. % | Foam Composition wt. % |
|---|---|---|
| calcined alumina | 65 | 42.3 |
| calcium aluminate cement | 11.5 | 7.5 |
| boric acid | 11.5 | 7.5 |
| zinc borosilicate frit | 11.5 | 7.5 |
| foaming agent | 0.5 | 0.3 |
| solids total | 100.0 | |
| hydrochloric acid* (37.6% conc.) | | 8.8 |
| water | | 26.1 |
| total | | 100.0 |

*specific gravity of 1.19

As described in Example 1, a slurry was made by mixing the blended dry materials with water.

Hydrochloric acid was added after foam was initially generated to constant volume and rapid mixing continued a time sufficient to uniformly disperse the hydrochloric acid throughout the mixture.

The foamed mixture was then poured into a mold, cured, dried and heated in a manner similar to that described in Example 1. The calcined alumina, calcium aluminate cement and foaming agent used had the same analysis as those materials used in Example 1. The zinc borosilicate frit was that known as P-1A44 zinc borosilicate frit sold by Pemco Products, Inorganic Chemicals Division of SCM Corp., 5601 T Eastern Avenue, Baltimore, Md. 21224. This foam resisted wetting and corrosion by molten aluminum extremely well and had a linear shrinkage which was substantially the same as that of Example 1. There was a tendency for the foam to adsorb moisture from the atmosphere at room temperature, however.

COMPARATIVE EXAMPLE

Comparative tests in which foam was generated through hydrogen evolution rather than by a foaming agent were run. This hydrogen generation was accomplished by adding an acid, such as phosphoric acid, to a mixture of alumina, gibbsite, a film forming agent such as methylcellulose, and an aluminum powder in an amount sufficient to cause reaction between the acid and aluminum powder. The basic formulation for this hydrogen generation foam is given in Table VI.

TABLE VI

Originial Ceramic Foam Composition of Comparative Examples

|  | Parts (by wt.) |
|---|---|
| calcined alumina | 87.25 |
| colloidal gibbsite | 10. |
| film forming agent | 2. |
| −100 mesh Tyler aluminum powder | 0.75 |
| Solids Total | 100.00 |
| water | 20. |
| phosphoric acid (85% concentration)* | 34. |

*amount same as water addition on volume basis

The alumina and colloidal gibbsite had the same analysis as those materials used in Example 1. The film forming agent used was methylcellulose. This basic formulation which produced a foam that readily collapsed or shrunk was subsequently modified in the following ways in an effort to minimize foam shrinkage:

(a) Hydrochloric acid was substituted for phosphoric acid.
(b) The acid-to-water ratio was varied from 0.50 to 0.83.
(c) The amount and size of the aluminum powder was varied, with the size of the particles varying from −60 mesh Tyler to −325 mesh Tyler.
(d) Aluminum hydroxychloride was added (up to 11 wt.%) as an additional stabilizing bond.
(e) Fumed silica was added (2 wt.%) as a foam stabilizer.
(f) The crystal size of the ground calcined alumina was varied.
(g) Fine particles sized gibbsite was added (2 to 15 wt.%) as an additional stabilizer.

The minimum foam shrinkage for any of these foams was approximately 20% by volume. Although this was substantially less than the shrinkage obtained with prior art compositions, a foam shrinkage of 20% by volume is much too high for a dimensionally stable castable. The optimum shrinkage of 20% may be compared with the shrinkage of Example 1 of a foam of this invention. It may be noted from Table II that the linear change in dimension or shrinkage of Sample I from its as-cast or cured condition to its air-dried condition is 0.02%. Thus, a foam of this invention is far superior in stability to a foamed ceramic of a heretofore known method. It may be noted further that even after heating to 1000° C. the shrinkage of a foamed ceramic of this invention was only a little over 1%. It may be further noted that the foamed ceramics described in Examples 2 and 3 had shrinkage characteristics similar to those of Example 1.

The timing of the reactions generating hydrogen and thereby causing evolution of the foam was critical. The initial cold bond had to set just before or as the mix reached its maximum volume. Premature set would not allow the mix to be lightweight and resulted in the presence of unreacted aluminum powder, causing the castable to overflow its forms upon heating. A delayed set was also found to be undesirable because the foam collapsed before the ceramic or heat setting bond made the foam rigid. In large batches, the foamed castable was not very uniform, i.e. only the top portion was foamed. The sensitivity of timing for bonds to set and the nonuniformity of the ceramic foam also make ceramic foams made by hydrogen generation undesirable.

It will be apparent to those skilled in the art that numerous variations of the details given above may be made without departing from this invention.

What is claimed is:

1. A method for making a stabilized foamed ceramic material suitable for use in making a refractory that is resistant to attack from molten metal, the method comprising the steps of:
   (a) mixing ceramic particles, foaming agent, calcium aluminate cement, and a colloidal bonding material with water for a time sufficient to produce a foamed slurry of constant volume; and
   (b) mixing phosphoric acid with said foamed slurry for a time sufficient to produce a foamed slurry of increased constant volume.

2. A method for making a stabilized foamed refractory shape that is resistant to attack from molten metal, the method comprising:
   (a) mixing ceramic particles, foaming agent, calcium aluminate cement and a colloidal bonding material with water for a time sufficient to produce a foamed slurry of constant volume;
   (b) mixing phosphoric acid with said foamed slurry for a time sufficient to produce a foamed ceramic material of increased constant volume;
   (c) placing said foamed ceramic material in a mold cavity to form a molded foamed shape;
   (d) curing and drying said molded shape; and
   (e) heating said molded, cured and dried shape to produce a foamed refractory shape.

3. The method as described in claim 1 wherein said ceramic particles are alumina, bauxite, mullite, fused silica, kyanite, clay, silicon carbide, zircon, or combinations thereof.

4. The method as described in claim 1 wherein said ceramic particles are alumina.

5. The method as described in claim 1 wherein said colloidal bonding material is colloidal alumina.

6. The method as described in claim 1 wherein said colloidal bonding material is colloidal gibbsite.

7. The method as described in claim 1 wherein said foamed ceramic material comprises 20 to 50 wt.% ceramic particles, 0.05 to 2 wt.% foaming agent, 1 to 20 wt.% colloidal bonding material, 2 to 25 wt.% calcium aluminate cement and 2 to 35 wt.% phosphoric acid.

8. A method of using a foamable ceramic composition comprising:
   (a) mixing ceramic particles, foaming agent, calcium aluminate cement, and a colloidal bonding material with water for a time sufficient to produce a foamed slurry of constant volume;
   (b) mixing phosphoric acid with said foamed slurry for a time sufficient to produce a foamed slurry of increased constant volume;
   (c) treating the foamed slurry of increased constant volume of step (b) to produce a refractory shape; and
   (d) contacting said shape with a molten metal.

9. A method of using a composition as claimed in claim 8 wherein said metal is aluminum.

10. A method of using a foamable ceramic composition comprising:
(a) mixing ceramic particles, foaming agent, calcium aluminate cement and a colloidal bonding material with water for a time sufficient to produce a foamed slurry of constant volume;
(b) mixing phosphoric acid with said foamed slurry for a time sufficient to produce a foamed ceramic material of increased constant volume;
(c) placing said foamed ceramic material in a mold cavity to form a molded foamed shape;
(d) curing and drying said molded shape;
(e) heating said molded, cured and dried shape to produce a foamed refractory shape; and
(f) contacting said shape with a molten metal.

11. A method of using a composition as claimed in claim 10 wherein said metal is aluminum.

* * * * *